Aug. 23, 1966    E. W. TURPIN    3,267,977
SUPPORT DEVICE FOR VEHICLE WHEELS
Filed May 21, 1965    2 Sheets-Sheet 1
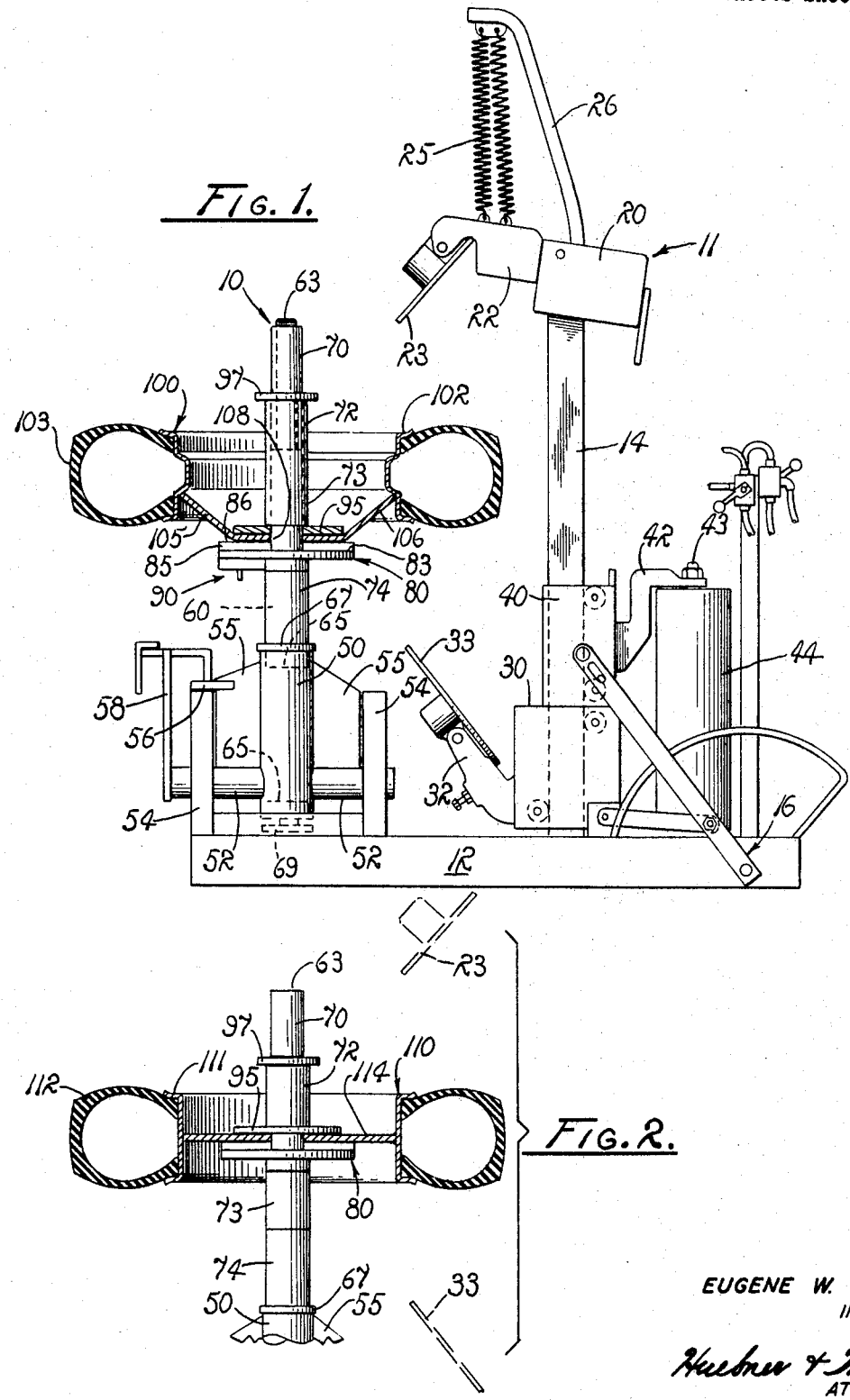
EUGENE W. TURPIN
INVENTOR
Huebner & Worrel
ATTORNEYS Aug. 23, 1966  E. W. TURPIN  3,267,977
SUPPORT DEVICE FOR VEHICLE WHEELS
Filed May 21, 1965  2 Sheets-Sheet 2
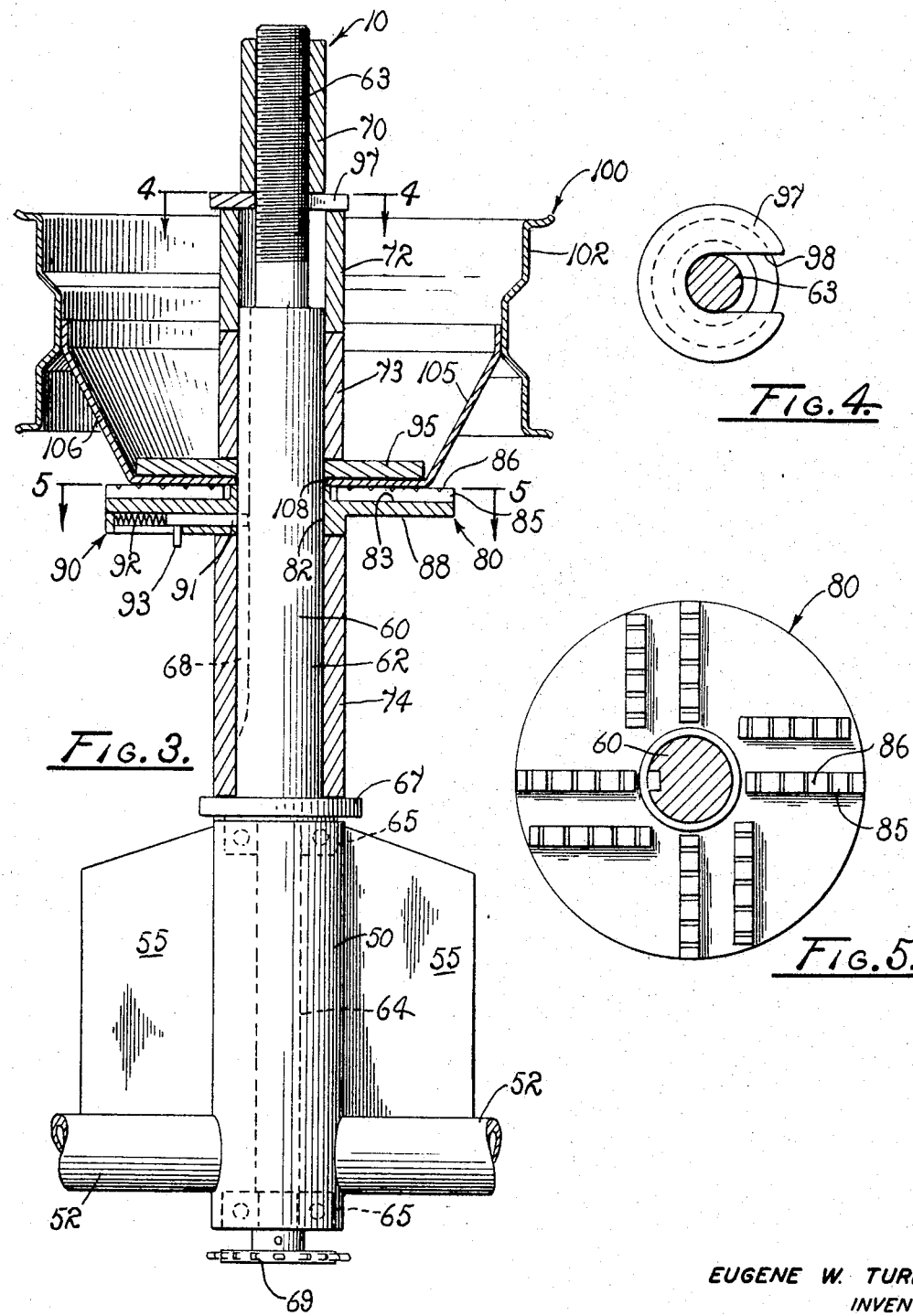
EUGENE W. TURPIN
INVENTOR
Huebner & Worrel
ATTORNEYS

United States Patent Office 3,267,977
Patented August 23, 1966

3,267,977
SUPPORT DEVICE FOR VEHICLE WHEELS
Eugene W. Turpin, 66 N. Academy, Sanger, Calif.
Filed May 21, 1965, Ser. No. 457,866
9 Claims. (Cl. 144—288)

The present invention relates to a support device for vehicle wheels and more particularly to such a device for supporting wheels of varied configuration and size in a predetermined optimum work position. While the device of the present invention is specifically intended and described herein for use on a tire dismounting apparatus of the type shown and described in my copending application Serial No. 303,285 entitled Wheel Supporting and Tire Dismounting Apparatus, filed August 20, 1963, now Patent No. 3,168,130, it will be apparent that the structure of the present invention is not limited to such environment or association.

The tire dismounting apparatus described in my above designated copending application provides a pair of power operated tire bead engaging shoes individually spaced above and below a tire and wheel assembly disposed on a support device associated therewith. The shoes are movable a predetermined distance toward each other to engage their respectively adjacent tire beads on the wheel. The wheel support device on the tire removing apparatus provides a single mounting position which disposes the wheel in centered relation between the shoes to insure that the shoes are able to engage their respective tire beads within their effective range of movement. For wheels having rims and hubs of a predetermined configuration intended to be accommodated by such a support device, this structure has been completely successful. However, wheels of varied rim and hub configurations may not be as precisely positioned on the support device between the shoes as desired for optimum operation of the tire removing apparatus. Accordingly, it was recognized that the wheel supporting device for the tire removing apparatus could be improved by modifying the support device so as to accommodate virtually all sizes and configurations of wheels and consistently to dispose the wheels in optimum work position on the device.

Accordingly, it is an object of the present invention to provide an improved support device for mounting and maintaining vehicle wheels in an optimum work position.

Another object is to provide such an improved support device on which a wheel may be quickly and conveniently installed and removed with a minimum of manipulation.

Another object is to provide a support device for vehicle wheels on which the wheels may be installed and removed without complete disassembly of the components of the support device.

Another object is to provide a support device of the character described having a wheel locking member permanently carried thereon capable of permitting installation and removal of wheels without removing said locking member.

Other objects and advantages of the present invention will subsequently become more clearly apparent upon reference to the following description and accompanying drawings.

In the drawings:

FIG. 1 is a side elevation of a support device embodying the principles of the present invention shown mounting a vehicle wheel.

FIG. 2 is a fragmentary side elevation of the support device mounting a wheel having a rim and hub of different configurations from the wheel of FIG. 1 with the wheel disposed in substantially the same relative position on the tire removing apparatus.

FIG. 3 is a somewhat enlarged transverse vertical section through the support device of the present invention.

FIG. 4 is a top plan horizontal section through the support device taken generally along the line 4—4 of FIG. 3.

FIG. 5 is a transverse horizontal section through the support device taken generally along line 5—5 of FIG. 3.

Referring more particularly to the drawings, a support device for a vehicle wheel embodying the principles of the present invention is indicated generally by the reference numeral 10. The support device is associated with a tire dismounting apparatus 11 which, while forming no part of the present invention, is briefly described more conveniently to illustrate the structure of the present invention. The tire dismounting apparatus is substantially similar to the apparatus described in greater detail in my above mentioned copending application and includes an elongated base 12. An elongated support post 14 is mounted on the base in substantially upright position and is movable longitudinally of the base in such upright position by a manually actuated lever system generally indicated by the reference numeral 16. An upper slide 20 is mounted on the upper end of the post and provides an integral arm 22 which pivotally mounts a disc type tire bead engaging shoe 23. The slide is normally constrained in an upwardly disposed position by a plurality of tension springs 25 suspended from a rod 26 upwardly extended from the post.

A lower slide 30 is mounted on the post 14 adjacent to the base 12 and provides an arm 32 which mounts a lower tire bead engaging shoe 33. A slide actuating carriage 40 is mounted in sliding relation on the post intermediate the upper and lower slides for selective releasable connection with the slides alternately to advance the shoes into bead engagement. The carriage is motivated by its connection through an arm 42 to the rod end 43 of an hydraulic jack 44 on the base 12.

The support device 10 of the present invention provides a tubular column 50 having rigidly mounted thereon a pair of diametrically opposed pivot shafts 52. The outer ends of the shafts are individually journaled in a pair of spaced brackets 54 upwardly extended from the base 12 in longitudinally spaced relation to the post 14. A pair of gusset plates 55 are individually secured between the pivot shafts and the column, as by welding or the like, better to insure rigidity of the column. A stop arm 56 is attached to one of the gusset plates for engagement with the upper end of its adjacent bracket 54 to maintain the column in a substantially upright attitude in spaced substantially parallel relation to the post 14. A lever 58 is connected to the outer end of one of the shafts 52 for connection with a suitable powered member, not shown, for tipping the column about the axis of the pivot shafts. This feature is also more completely described in my above mentioned copending application.

An elongated wheel mounting spindle indicated generally by the reference numeral 60 is supported on the base 12 of the tire dismounting apparatus 11 by the tubular column 50. The spindle provides an intermediate wheel mounting portion 62 of a predetermined diameter, an upper reduced diameter screw threaded end 63, and a lower reduced diameter journal end 64. The lower journal end is mounted in spaced bearings 65 individually disposed adjacent to the upper and lower ends of the column. The spindle further includes an annular flange 67 which is disposed against the upper bearing 65 and is of a diameter somewhat larger than the diameter of the mounting portion 62 of the spindle. An elongated groove 68 is formed in the intermediate portion 62 of the spindle and has an upper end which opens upwardly adjacent to the screw threaded end of the spindle and oppositely terminates short of the flange. A drive sprocket 69 is mounted on the lower end of the spindle beneath the column for connection with a suitable drive motor, not shown, for rotating the spindle. This structure is also a part of my said copending application.

An elongated cylindrical lock nut 70 is screw threadably received upon the upper screw threaded end 63 of the spindle 60 and provides an outside diameter substantially the same as the diameter of the intermediate portion 62 of the spindle. A plurality of elongated tubular sleeves 72, 73, and 74, preferably of different lengths are adapted to be axially slidably received over the lock nut 70 and upon the intermediate portion 62 of the spindle. The sleeves may be arranged on the spindle in any desired relation in a manner subsequently to be more fully described.

As best shown in FIGS. 3 and 5, a circular wheel support plate 80 is adapted to be mounted on the spindle in selected stacked relation with the sleeves 72, 73 and 74. The support plate provides a central opening 82 of a diameter slidably to be received over the lock nut 70 and upon the intermediate portion 62 of the spindle. The plate includes an upper surface 83 having a plurality of circumferentially spaced radially extended lugs 85 disposed thereon individually providing upper serrated gripping surfaces 86. The plate provides an opposite lower surface 88 on which is mounted a detent mechanism 90 providing a finger 91 extendable into the groove 68 of the spindle by a compression spring 92. The finger is manually retractable from the groove by manipulation of a pin 93 extended in depending relation from the finger.

An annular compression washer or spacer ring 95 is provided for mounting on the spindle by being positionable over the lock nut 70 in a manner similar to the sleeves 72, 73 and 74, and the support plate 80 as may be required by the particular configuration of the wheel to be mounted on the spindle. As best shown in FIG. 4, a substantially U-shaped force transmitting ring 97 is adapted to be disposed between the lock nut and the uppermost sleeve 72 on the spindle. The force transmitting ring is of a diameter somewhat larger than the outside diameter of the sleeves and provides a radially extended slot 98 therethrough of a width slightly larger than the diameter of the upper end 63 of the spindle.

A wheel assembly 100 is shown in FIGS. 1 and 3 providing an annular rim 102 supporting a tire 103. The wheel includes a hub 105 having an angular wall portion 106 extended axially outwardly from the rim. A circular opening 108 is concentrically formed within the hub of a diameter somewhat larger than the lock nut 70 and intermediate portion 62 of the spindle.

An alternative wheel assembly 110 is shown in FIG. 2 providing an annular rim 111 supporting a tire 112. The wheel assembly includes a substantially flat hub 114 disposed in centered relation within the rim.

*Operation*

The operation of the described embodiment of the subject invention is believed to be clearly apparent and is briefly summarized at this point. Before installing a wheel assembly on the support device 10, the desired work position of the wheel relative to the tire dismounting apparatus 11 is determined by its particular rim and hub configuration. That is, some wheels have their rims and hubs in substantially a common plane of reference while other wheels have their hubs and rims substantially offset in an axial direction from such a plane of reference. Inasmuch as devices for supporting wheels in work position normally engage the hubs or adjacent portions thereof, axial spacing of the hubs and rims appreciably vary the ultimate work positions of the rims if the hubs are constrained to a uniform position. In prior devices, this has resulted in disposing the rims in a multiplicity of work positions dependent upon relative axial displacement of the hubs and rims, many of which positions have been inconvenient and entirely unsuited to efficient operation. The device of the present invention makes possible the convenient and swift accommodation to such variations so as to permit the maintenance of optimum work positions.

When it is desired to mount the wheel assembly 100 of FIGS. 1 and 3 on the support device, it is assumed that the spindle 60 is unencumbered except for the lock nut 70 disposed on the upper screw threaded end 63 thereof. The longest sleeve 74 is axially slid over the lock nut and thence downwardly upon the intermediate wheel mounting portion 62 to rest against the flange 67. The wheel support plate 80 is then disposed upon the intermediate portion 62 of the spindle in a similar manner as the sleeve with the detent finger 90 manually retracted against the spring 92. The plate is rotated and the detent finger released so as automatically to extend into the groove 68 in the spindle upon alignment therewith and the plate is rested upon the upper end of the sleeve 74.

The wheel assembly 100 is then disposed upon the spindle 60 by positioning the opening 108 over the lock nut 70 and the mounting portion 62 of the spindle in a position rested upon the upper gripping surfaces 86 of the lugs 85 of the support plate 80. The spacer ring 95 is disposed in circumscribing relation to the spindle upon the hub 105 of the wheel assembly to provide uniform application of constraining force thereagainst. The need for the spacer ring is even more obvious for mounting hubs having an opening therethrough larger than the opening 108 of the wheel assembly 100.

The sleeves 72 and 73 are axially positioned upon the spindle above the spacer ring 95 which, together with the wheel assembly 100, the spacer ring 95, the support plate 80, and the lower sleeve 74, provide a stacked assembly precisely to position the tire 103 and the rim 102 in the desired centered relation between the bead engaging shoes 23 and 33 of the tire dismounting apparatus 11. The stacked assembly is constrained in such position by laterally positioning the force transmitting ring 97 about the upper end 63 of the spindle between the uppermost sleeve 72 and the lock nut 70. The lock nut is then hand tightened against the force transmitting ring positively to hold the stacked assembly on the spindle. It is noted that all the components of the stacked assembly, except the ring 97, are axially slidable onto the spindle over the lock nut which enables the lock nut to remain in place on the spindle to preclude its being separated therefrom and lost. Even more significantly, since it does not need to be removed and replaced during each operation, much time is saved and rapid wheel mounting and removal is facilitated. Furthermore, the upper gripping surfaces 86 of the lugs tightly constrain the hub of the wheel assembly against relative rotation and thereby provide a positive drive between the spindle and the rim 102.

The support device 10 of the present invention readily accommodates wheel assemblies having different rim and hub configurations such as that provided by the wheel assembly 110 shown in FIG. 2. In this instance, the wheel support plate 80 is raised to compensate for the axial displacement of the hub 105 of FIG. 1 to the position of the hub 114 of FIG. 2. In order to achieve such placement of the support plate, the sleeves 73 and 74 are successively mounted on the spindle in supporting relation to the plate with only the spacer ring 95 and the sleeve 72 disposed above the hub. The force transmitting ring 97 is then laterally extendable about the upper end of the spindle to provide a surface against which the lock nut 70 may be tightened to constrain the stacked assembly in the desired position on the spindle. It is readily apparent that the wheel support plate and wheel assembly may be axially positioned at a number of axial positions on the spindle to accommodate differences in the configuration of the rim and hub of the wheel assembly by the selected ordered arrangement of the sleeves 72, 73 and 74 in relation to the support plate 80.

In view of the foregoing, it is readily apparent that the structure of the present invention has provided an improved support device for vehicle wheels which has particular utility in connection with tire dismounting apparatus. Such structure is effective to dispose the vehicle wheel in a predetermined optimum work position irrespective of variations in relative axial positions or spacing of the rim and hub of the wheel. The structure of the present invention may be quickly and conveniently modified to adapt to the particular requirements and to accommodate such variations with a minimum of physical effort and manual manipulation of the support device. It is further significant that the locking nut for constraining the wheel on the support device is permanently carried by the spindle and need not be removed during adjustments or utilization of the device.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A support device for a work object comprising a base; an elongated mounting member supported on the base mounting such a work object thereon in spaced relation to the base; at least one spacer member interchangeably positionable on said mounting member in intimately facing engagement with the work object, said spacer member and said work object forming a stacked assembly on the mounting member with the work object being selectively disposable relative to the spacer member in a plurality of positions variably spaced from the base; and lock means mountable on the mounting member and engageable with said stacked assembly to hold the spacer member and work object in selected ordered arrangement 2. A support device for a work object comprising a base; an elongated mounting member supported on the base mounting such a work object thereon in spaced relation to the base; lock means carried on said mounting member in spaced relation to the base; a plurality of spacer members of different predetermined lengths having opposite ends interchangeably positionable on said mounting member in endwardly intimately facing engagement with each other and with said work object, said spacer members and said work object forming a stacked assembly on the mounting member with the work object being selectively disposable within the stacked assembly in a plurality of positions differently spaced from the base; and force transmitting means mountable on the mounting member between said lock means and the stacked assembly tightly to hold said work object in said selected positions incident to manipulation of said lock means.

3. A support device for a wheel comprising a spindle having an extended end adapted to receive the wheel thereon; means mounting the spindle with the extended end upwardly disposed; a stop mounted on the spindle in spaced relation to the extended end thereof; a sleeve slidably fitted to the spindle; a wheel mounting plate slidably fitted to the spindle, said wheel, mounting plate and sleeve being receivable on the spindle in selected variable sequence in intimately facing rested relation on the stop and on each other; and a lock engageable with the extended end of the spindle axially to hold the wheel, plate and sleeve on the spindle.

4. A support device for a wheel comprising an elongated spindle; means mounting the spindle so as to provide an extended end adapted to receive the wheel thereon, said spindle having a cylindrical main portion of substantially uniform diameter and the extended end being of reduced diameter; a stop mounted on the spindle in spaced relation to the extended end thereof; a sleeve slidably fitted to the main portion of the spindle; a wheel mounting plate slidably fitted to the main portion of the spindle, said wheel, mounting plate and sleeve being receivable on the spindle in selected variable sequence; a nut having an outside diameter adapted to receive said wheel, mounting plate and sleeve thereover screw threadably mounted on the extended end of the spindle; and a compression washer having an outside dimension substantially greater than the diameter of the main portion of the spindle and an opening substantially fitted to the extended end of the spindle, said washer being slotted for mounting and removal transversely on the extended end of the spindle without removing the nut whereby with the washer on the spindle the nut can be tightened thereagainst to clamp said wheel, mounting plate and sleeve between the stop and washer and with the washer removed said wheel, mounting plate and sleeve can be removed and reinstalled over the nut.

5. A support device for a wheel comprising an elongated spindle; means mounting the spindle for rotation and so as to provide an extended end adapted to receive the wheel thereon, said spindle having a cylindrical main portion of substantially uniform diameter and the extended end being of reduced diameter; a stop mounted on the spindle in spaced relation to the extended end thereof; a plurality of sleeves slidably fitted to the main portion of the spindle; a wheel mounting plate slidably fitted to the main portion of the spindle, said wheel, mounting plate and sleeves being receivable on the spindle in selected variable sequence; means providing rotational drive between the spindle and the plate; means providing rotational drive between the plate and the wheel; a nut having an outside diameter substantially equal to the diameter of the main portion of the spindle adapted to receive said wheel, mounting plate and sleeves thereover screw threadably mounted on the extended end of the spindle; and a compression washer having an outside dimension substantially greater than the diameter of the main portion of the spindle and an opening substantially fitted to the extended end of the spindle, said washer being slotted for mounting and removal transversely on the extended end of the spindle without removing the nut whereby with the washer on the spindle the nut can be tightened thereagainst to clamp said wheel, mounting plate and sleeves between the stop and washer and with the washer removed said wheel, mounting plate and sleeves can be removed and reinstalled over the nut.

6. A support device for a work object comprising a base; an elongated spindle supported on the base on a predetermined substantially upright axis mounting such a work object therein in spaced relation to the base; a lock nut carried by the spindle; a plurality of spacer sleeves slidably over said lock nut and interchangeably axially positionable on said spindle in intimately facing engagement with said work object, said sleeves and said work object forming a stacked assembly on the spindle in spaced relation to said lock nut with the work object selectively disposable within the stacked assembly in a plurality of positions variably spaced from the base; and a slotted force transmitting member laterally extendable about said spindle between the stacked assembly and the lock nut for axially constraining said stacked assembly on the spindle incident to the tightening of the lock nut against said force transmitting member axially to hold said work object in said selected positions.

7. A support device for accommodating vehicle wheels of varied configuration and for maintaining such wheels in an optimum work position on the device, comprising a base; an elongated spindle supported on the base for rotation about a predetermined substantially upright axis; a lock nut carried by the spindle; a plurality of cylindrical spacer sleeves of different predetermined lengths having opposite ends slidable over said lock nut and interchangeably axially positionable on said spindle in endwardly intimately facing engagement with each other and with such a wheel; a circular wheel support plate having a central opening therethrough slidable over said lock nut for positioning the support plate upon said spindle, said sleeves, support plate and wheel forming a stacked assembly on the spindle in spaced relation to said lock nut with the wheel selectively disposable within the stacked assembly in a plurality of positions variably spaced from the base; and a slotted ring laterally extendable about said spindle between the stacked assembly and the lock nut for axially constraining said stacked assembly on the spindle incident to tightening of the lock nut thereagainst to hold said wheel in said selected positions in driven relation on the spindle.

8. A support device for accommodating vehicle wheels of varied configuration and for maintaining such wheels in an optimum work position on the device, comprising a base; an elongated spindle supported on the base for rotation about a predetermined substantially upright axis and providing an elongated axially extended groove; a lock nut carried by the spindle; a plurality of cylindrical spacer sleeves of different predetermined lengths having opposite ends slidable over said lock nut and interchangeably axially positionable on said spindle in endwardly intimately facing engagement with each other and with such a wheel; a circular wheel support plate having a central opening therethrough slidable over said lock nut for positioning the support plate upon said spindle with the support plate including a detent retractably engageable with said groove in the spindle, said sleeves, support plate and wheel forming a stacked assembly on the spindle in spaced relation to said lock nut with the wheel selectively disposable within the stacked assembly in a plurality of positions variably spaced from the base; and a slotted ring laterally extendable about said spindle between the stacked assembly and the lock nut for axially constraining said stacked assembly on the spindle incident to tightening of the lock nut thereagainst to hold said wheel in said selected positions in driven relation on the spindle.

9. A support device for accommodating vehicle wheels of varied configuration and for maintaining such wheels in an optimum work position on the device, comprising a base; a tubular column supported on the base and providing a substantially upright position; an elongated spindle having a lower flanged end rotatably mounted within the column and providing a wheel mounting portion of a predetermined diameter upwardly extended therefrom and terminating in an upper screw threaded end of a diameter less than the diameter of said mounting portion, said spindle including an elongated axially extended groove; a cylindrical lock nut of the same diameter as the mounting portion of the spindle screw threadably permanently disposed on said upper end of the spindle; a circular wheel support plate having a central opening therethrough being slidable over said lock nut and onto said mounting portion of the spindle and including a detent retractably engageable with said groove in the spindle to provide a driving connection therebetween, said plate further including a plurality of upwardly disposed circumferentially spaced radially extended lugs frictionally to engage said wheel in supporting driving relation; a plurality of cylindrical spacer sleeves slidable over said lock nut and interchangeably axially positionable on said spindle with such a wheel, said sleeves, support plate and wheel forming a stacked assembly on the spindle with the wheel being selectively disposable within the stacked assembly in a plurality of positions variably spaced from the base; and a substantially U-shaped lock ring laterally extendable about said upper end of the spindle between said lock nut and the stacked assembly tightly to clamp said assembly against the lower flanged end of the spindle so as to hold said wheel in driven relation on the spindle in said selected positions incident to the tightening of said lock nut against the lock ring.

References Cited by the Examiner
UNITED STATES PATENTS

| 2,351,355 | 6/1944 | Merrett | 144—288 |
| 3,074,468 | 1/1963 | Tarazona | 144—288 |

FOREIGN PATENTS

| 1,021,263 | 12/1957 | Germany. |

WILLIAM W. DYER, JR., *Primary Examiner.*

R. J. ZLOTNIK, *Assistant Examiner.*